(12) United States Patent
Miyamoto (10) Patent No.: US 10,061,165 B2
(45) Date of Patent: Aug. 28, 2018

(54) LIQUID CRYSTAL DISPLAY DEVICE INCLUDING CONTACT HOLES AND SPACERS POSITIONED RELATIVE THERETO

(71) Applicant: Japan Display Inc., Minato-ku (JP)

(72) Inventor: Motoharu Miyamoto, Tokyo (JP)

(73) Assignee: Japan Display Inc., Minato-ku (JP)

( * ) Notice: Subject to any disclaimer, the term of this patent is extended or adjusted under 35 U.S.C. 154(b) by 0 days.

(21) Appl. No.: 15/359,949

(22) Filed: Nov. 23, 2016

(65) Prior Publication Data

US 2017/0153482 A1 Jun. 1, 2017

(30) Foreign Application Priority Data

Nov. 27, 2015 (JP) ................. 2015-231890

(51) Int. Cl.
*G02F 1/1339* (2006.01)
*G02F 1/1343* (2006.01)
*G02F 1/1362* (2006.01)
*G02F 1/1333* (2006.01)
*G02F 1/1335* (2006.01)
*G02F 1/1337* (2006.01)

(52) U.S. Cl.
CPC ........ *G02F 1/13394* (2013.01); *G02F 1/1343* (2013.01); *G02F 1/133514* (2013.01); *G02F 1/136286* (2013.01); *G02F 1/1337* (2013.01); *G02F 1/1339* (2013.01); *G02F 1/133345* (2013.01); *G02F 1/133512* (2013.01); *G02F 1/133528* (2013.01); *G02F 2201/121* (2013.01); *G02F 2201/123* (2013.01)

(58) Field of Classification Search
CPC .......... G02F 1/13394; G02F 1/136286; G02F 1/1339
See application file for complete search history.

(56) References Cited

U.S. PATENT DOCUMENTS

| | | | | |
|---|---|---|---|---|
| 2015/0301376 A1* | 10/2015 | Kim | ................. | G02F 1/13394 349/43 |
| 2016/0077369 A1* | 3/2016 | Kim | ................. | G02F 1/13394 349/43 |
| 2016/0202529 A1* | 7/2016 | Kwak | ................ | G02F 1/13394 257/72 |
| 2016/0259205 A1* | 9/2016 | Kwak | ................ | G02F 1/13394 |

FOREIGN PATENT DOCUMENTS

JP 2009-251417 10/2009

* cited by examiner

*Primary Examiner* — Donald Raleigh
(74) *Attorney, Agent, or Firm* — Oblon, McClelland, Maier & Neustadt, L.L.P.

(57) ABSTRACT

According to one embodiment, a liquid crystal display device includes a first substrate including a scanning line, a first relay electrode, a second relay electrode, a first contact portion opposed to the first relay electrode, and a second contact portion opposed to the second relay electrode, and a spacer, a first contact hole for connecting the first relay electrode and the first contact portion being located on one side with respect to the scanning line, a second contact hole for connecting the second relay electrode and the second contact portion being located on the other side with respect to the scanning line, the spacer being located between the first contact hole and the second contact hole.

13 Claims, 10 Drawing Sheets

FIG. 10

LIQUID CRYSTAL DISPLAY DEVICE INCLUDING CONTACT HOLES AND SPACERS POSITIONED RELATIVE THERETO

CROSS-REFERENCE TO RELATED APPLICATIONS

This application is based upon and claims the benefit of priority from Japanese Patent Application No. 2015-231890, filed Nov. 27, 2015, the entire contents of which are incorporated herein by reference.

FIELD

Embodiments described herein relate generally to a liquid crystal display device.

BACKGROUND

Recently, liquid crystal display devices of a lateral electric field mode have been put into practical use. In the lateral electric field mode, liquid crystal molecules included in a liquid crystal layer are driven by using an electric field produced between a pixel electrode and a common electrode provided on the same substrate. As an example of the liquid crystal display device to which the lateral electric field mode is applied, a liquid crystal display device comprising a first spacer provided near a contact hole, at a place where it overlap a drain electrode of a switching element, and a second spacer provided at a position different from the first spacer has been proposed.

Requirement for higher definition has recently been increased, and there is a tendency that a pixel pitch is reduced. As a result, a pitch between the contact holes provided at the respective pixels is also being reduced. In specifications in which the contact hole is provided on a substrate on one side and a spacer provided on the other substrate is located close to the contact hole, when a misalignment between a pair of these substrates occurs, the spacer may fall into the contact hole, making it impossible to maintain a desired cell gap, and the display quality may be deteriorated.

DETAILED DESCRIPTION

In general, according to one embodiment, a liquid crystal display device includes: a first substrate including a scanning line, a first signal line and a second signal line intersecting the scanning line, a first switching element comprising a first relay electrode and being electrically connected to the first signal line, a second switching element comprising a second relay electrode and being electrically connected to the second signal line, a first pixel electrode comprising a first contact portion which is opposed to the first relay electrode, and a second pixel electrode comprising a second contact portion which is opposed to the second relay electrode; a second substrate opposed to the first substrate; a liquid crystal layer held between the first substrate and the second substrate; and a spacer located between the first substrate and the second substrate, a first contact hole for connecting the first relay electrode and the first contact portion being located on one side with respect to the scanning line, a second contact hole for connecting the second relay electrode and the second contact portion being located on the other side with respect to the scanning line, the spacer being located between the first contact hole and the second contact hole.

According to another embodiment, a liquid crystal display device includes: a first substrate including first to third scanning lines arranged in order, a first signal line and a second signal line intersecting the second scanning line, a first switching element electrically connected to the first signal line, a second switching element electrically connected to the second signal line, a first pixel electrode comprising a first contact portion which is connected to the first switching element, and a second pixel electrode comprising a second contact portion which is connected to the second switching element; a second substrate opposed to the first substrate; a liquid crystal layer held between the first substrate and the second substrate; and a spacer located between the first substrate and the second substrate, a first contact hole for connecting the first switching element and the first contact portion being located between the second scanning line and the third scanning line, a second contact hole for connecting the second switching element and the second contact portion being located between the first scanning line and the second scanning line, the spacer being located between the first contact hole and the second contact hole.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the structural elements, which have functions identical or similar to the functions described in connection with preceding drawings, are denoted by the same reference numbers, and a duplicated detailed description thereof may be arbitrarily omitted.

Figure 1:
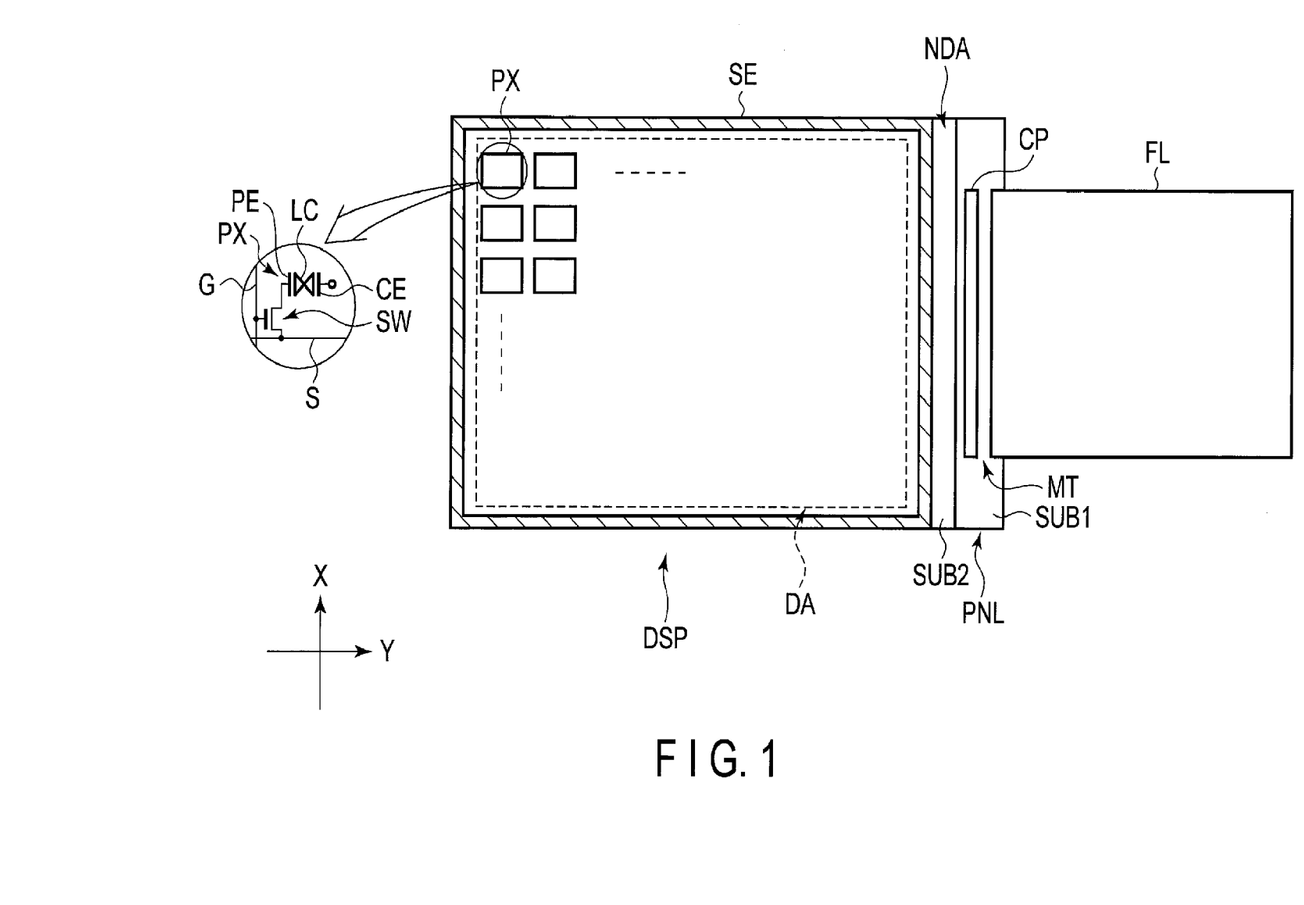
FIG. 1 is a plan view showing the structure of a liquid crystal display device DSP of the present embodiment.

FIG. 1 is a plan view which shows the structure of a liquid crystal display device DSP of the present embodiment.

That is, a display panel PNL which constitutes the liquid crystal display device DSP includes a first substrate SUB1, a second substrate SUB2 opposed to the first substrate SUB1, and a liquid crystal layer LC held between the first substrate SUB1 and the second substrate SUB2. The first substrate SUB1 and the second substrate SUB2 are adhered to each other by a sealant SE with a predetermined cell gap formed therebetween. The liquid crystal layer LC is held inside an area surrounded by the sealant SE in the cell gap between the first substrate SUB1 and the second substrate SUB2. The display panel PNL includes a display area DA in which an image is displayed on the inner side surrounded by the sealant SE. The display area DA is composed of a plurality of pixels PX. In the example illustrated, the display area DA is formed rectangular, but it may be formed in a different polygonal shape or another shape such as circular or elliptical.

The first substrate SUB1 includes, in the display area DA, a scanning line G, a signal line S, a switching element SW, a pixel electrode PE, and a common electrode CE. The gate line G extends in, for example, a first direction X. The signal line S extends in a second direction Y intersecting the first direction X. In the example illustrated, the first direction X and the second direction Y are orthogonal to each other. Note that the scanning line G need not be formed as a linear shape parallel to the first direction X and the signal line S need not be formed as a linear shape parallel to the second direction Y. For example, the scanning line G and the signal line S may be bent or may be partly branched.

The switching element SW is electrically connected to the scanning line G and the signal line S in each of the pixels PX. The pixel electrode PE is electrically connected to the switching element SW in each of the pixels PX. The common electrode CE is provided to be common to the plurality of pixels PX, and is set to a common potential.

Signal supply sources necessary to drive the display panel PNL, such as a drive IC chip CP and a flexible printed circuit (FPC) FL, are located in a non-display area NDA outside the display area DA. In the example illustrated, the drive IC chip CP and the FPC FL are mounted on a mounting portion MT of the first substrate SUB1 which extends to the outer side of the second substrate SUB2.

Further, the display panel PNL is a transmissive display panel having a transmissive display function of displaying an image by, for example, selectively passing light from a backlight unit BL which will be described later, but is not limited to this. For example, the display panel PNL may be a reflective display panel having a reflective display function of displaying an image by selectively reflecting light from the display surface side, such as external light and auxiliary light from a front light unit. Furthermore, the display panel PNL may be a transflective display panel with both the transmissive and reflective display functions.

Also, although explanation of a detailed structure of the display panel PNL is omitted here, in an X-Y plane defined by the first direction X and the second direction Y, or a display mode using a lateral electric field along the substrate main surface, both of the pixel electrode PE and the common electrode CE are provided on the first substrate SUB1. Further, in a display mode which uses a vertical electric field along the normal line of the X-Y plane, or a display mode which uses a tilted electric field which is inclined obliquely with respect to the X-Y plane, while the pixel electrode PE is provided on the first substrate SUB1, the common electrode CE is provided on the second substrate SUB2. Furthermore, the display panel PNL may have a structure corresponding to a display mode using an arbitrary combination of the vertical, lateral, and tilted electric fields.

Figure 2:
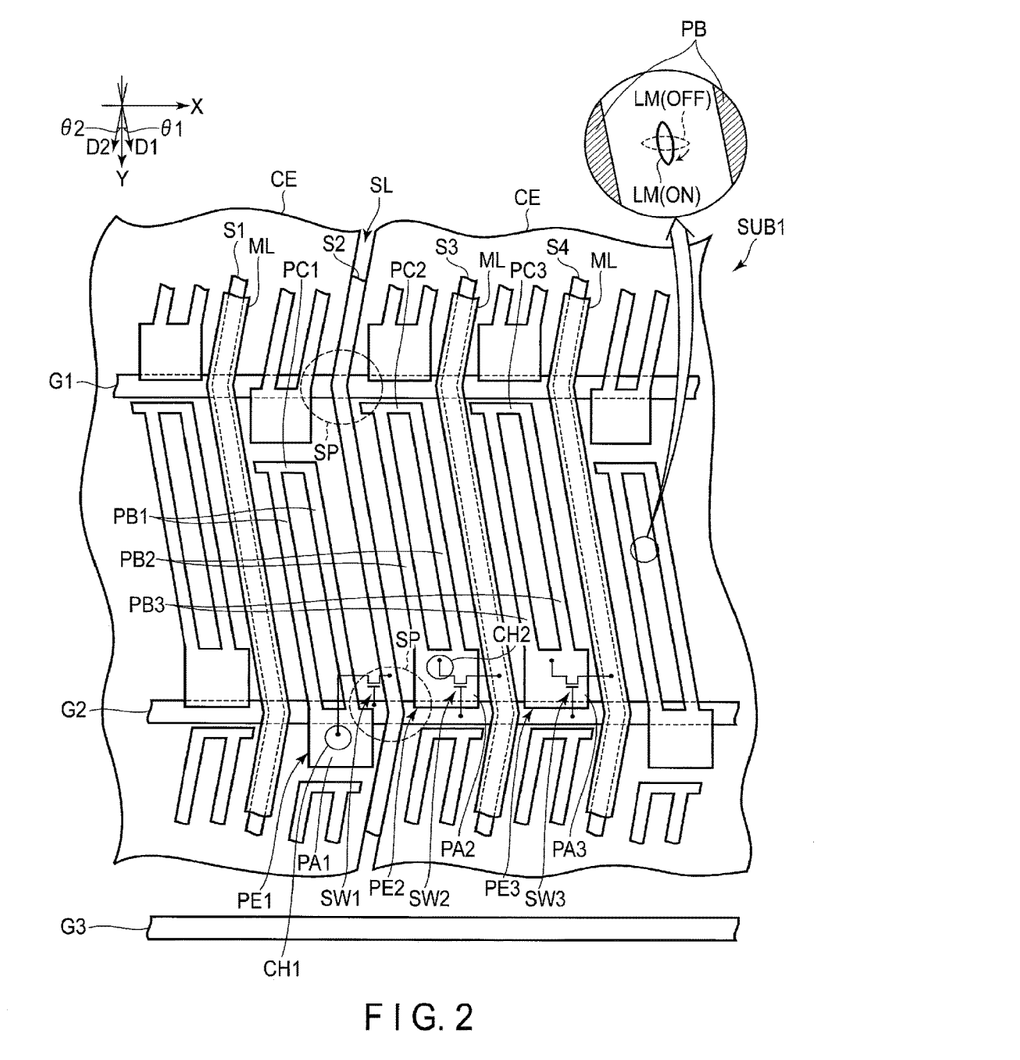
FIG. 2 is a plan view showing an example of the structure of a first substrate SUB1 illustrated in FIG. 1.

FIG. 2 is a plan view showing an example of the structure of the first substrate SUB1 illustrated in FIG. 1. Here, an example of the structure of the first substrate SUB1 to which a display mode using the lateral electric field is applied will be described as an example of the display mode. Note that only the main portions necessary for explanation are shown in the figure. In the figure, a direction intersecting the second direction Y anticlockwise at an acute angle is defined as direction D1, and a direction intersecting the second direction Y clockwise at an acute angle is defined as direction D2. Note that angle θ1 made between the second direction Y and direction D1 is substantially the same as angle θ2 made between the second direction Y and direction D2.

The first substrate SUB1 includes scanning lines G1 to G3, signal lines S1 to S4, switching elements SW1 to SW3, pixel electrodes PE1 to PE3, the common electrode CE, a metal layer ML, and the like.

The scanning lines G1 to G3 extend along the first direction X, and are arranged at a regular pitch in the second direction Y. Although the illustration of elements between the scanning line G2 and the scanning line G3 is omitted, a pitch between the scanning line G2 and the scanning line G3 is equal to a pitch between the scanning line G1 and the scanning line G2. The signal lines S1 to S4 extend substantially along the second direction Y, and are arranged at a regular pitch in the first direction X. In the example illustrated, the signal lines S1 to S4 extend in direction D1 between the scanning line G1 and the scanning line G2, and extend in direction D2 between the scanning line G2 and the scanning line G3. The scanning lines G1 to G3 and the signal lines S1 to S4 cross one another in the X-Y plane.

The switching element SW1 is located near the intersection of the scanning line G2 and the signal line S2, and is electrically connected to the scanning line G2 and the signal line S2. The switching element SW2 is located near the intersection of the scanning line G2 and the signal line S3, and is electrically connected to the scanning line G2 and the signal line S3. The switching element SW3 is located near the intersection of the scanning line G2 and the signal line S4, and is electrically connected to the scanning line G2 and the signal line S4. Although the switching elements SW1 to SW3 are simplified in this figure, a detailed description of them will be given later.

The pixel electrodes PE1 to PE3 are aligned at intervals in the first direction X. The pixel electrode PE1 is located between the signal lines S1 and S2, and is electrically connected to the switching element SW1. The pixel electrode PE1 is located between the scanning line G1 and the scanning line G3, and intersects the scanning line G2. The pixel electrode PE1 includes a contact portion PA1, an electrode portion PB1, and a connecting portion PC1. The contact portion PA1 is electrically connected to the switching element SW1. The contact portion PA1 is disposed on the side closer to the scanning line G3, which is one of the sides relative to the scanning line G2, in other words, disposed between the scanning line G2 and the scanning line G3. The electrode portion PB1 extends from the contact portion PA1 to the side closer to the scanning line G1, which is the other side relative to the scanning line G2. The electrode portion PB1 is located between the scanning line G1 and the scanning line G2. The electrode portion PB1 may be referred to as a strip electrode, a linear electrode, a comb electrode, etc. In the example illustrated, a single pixel electrode PE1 includes two electrode portions PB1. The two electrode portions PB1 are connected to the contact portion PA1 on the scanning line G2, and apart of the scanning line G2 is exposed from a gap between the two electrode portions PB1. In this way, by reducing an overlapping area of the pixel electrode and the scanning line, a capacitance between the pixel electrode and the scanning line can be reduced. These electrode portions PB1 are aligned at intervals in the first direction X. The connecting portion PC1 is connected to end portions of the two electrode portions PB1.

Note that the shape of the pixel electrode PE1 is not limited to the example illustrated. That is, for example, the connecting portion PC1 can be omitted, and the number of electrode portions PB1 may not be two. However, as shown in the drawing, when the pixel electrode PE1 is formed in a loop shape by the contact portion PA1, the two electrode portions PB1, and the connecting portion PC1, even if the width of the pixel electrode PE1 in the first direction X is reduced, or the width of each of the electrode portions PB1 in the first direction X is reduced in accordance with achieving higher definition, it becomes possible to improve redundancy. That is, even if break occurs at a part of the pixel electrode PE1, a pixel potential can be supplied to any parts via paths passing through the other parts.

The pixel electrode PE2 and the pixel electrode PE3 are also formed in substantially the same shape as the pixel electrode PE1. The pixel electrode PE2 and the pixel electrode PE3 will be hereinafter briefly described.

The pixel electrode PE2 is located between the signal lines S2 and S3, and is electrically connected to the switching element SW2. The pixel electrode PE2 is located between the scanning line G1 and the scanning line G2, and does not extend between the scanning line G2 and the scanning line G3. The pixel electrode PE2 includes a contact portion PA2, an electrode portion PB2, and a connecting portion PC2. The contact portion PA2 is electrically connected to the switching element SW2. The contact portion PA2 is disposed on the side closer to the scanning line G1 with respect to the scanning line G2, in other words, disposed between the scanning line G1 and the scanning line G2. The electrode portion PB2 extends from the contact portion PA2 toward the scanning line G1. The electrode portion PB2 is located between the scanning line G1 and the scanning line G2. However, the electrode portion PB2 is closer to the scanning line G1 than the electrode portion PB1 is. Note that in a planar view, an overlapping area of the pixel electrode PE2 and the scanning line G2 is smaller than an overlapping area of the pixel electrode PE1 and the scanning line G2. The pixel electrode PE2 may not overlap the scanning line G2.

Similarly, the pixel electrode PE3 is located between the signal lines S3 and S4, and is electrically connected to the switching element SW3. The pixel electrode PE3 includes a contact portion PA3, an electrode portion PB3, and a connecting portion PC3. The contact portion PA3 is disposed on the side closer to the scanning line G1 with respect to the scanning line G2, and is electrically connected to the switching element SW3. The electrode portion PB3 extends from the contact portion PA3 toward the scanning line G1. That is, the electrode portions PB1 to PB3 all extend in the same direction, and in the example illustrated, extend in the direction parallel to direction D1. The electrode portions PB1 to PB3 all extend from their respective contact portions toward the scanning line G1.

The common electrode CE extends in substantially the entirety of the first substrate SUB1. That is, in the X-Y plane, the common electrode CE overlaps not only the pixel electrodes PE1 to PE3, but also the scanning lines G1 to G3, and extends in the second direction Y. The illustrated example is premised on an in-cell touch panel liquid crystal display panel in which a circuit module used for both touch detection and image display is provided within a display panel. Accordingly, the common electrode CE overlaps the signal lines S1, S3, and S4, extends in the first direction X, and includes a slit SL at a position opposed to the signal line S2. Slits SL are provided at predetermined intervals in the direction parallel to the signal lines, and the divided common electrode CE is also used as one of detection electrodes for touch panel.

In the X-Y plane, metal layers ML overlap the signal lines S1, S3, and S4, and extend parallel to these signal lines, respectively. Note that the metal layer ML is not arranged at a position opposed to the signal line S2 where the slit SL is formed.

Spacers SP as shown by broken lines in the figure are arranged at, for example, the intersection of the scanning line G1 and the signal line S2, and the intersection of the scanning line G2 and the signal line S2. As will be described later, the spacers SP include a main spacer which maintains the cell gap between the first substrate SUB1 and the second substrate SUB2, and a sub-spacer which is provided on either one of the substrates and is separated from the other one of the substrates. In one example, the sub-spacer is located at the intersection of the scanning line G1 and the signal line S2, and the main spacer is located at the intersection of the scanning line G2 and the signal line S2. The main spacer and the sub-spacer can be formed together by using the same resin material. The main spacer and the sub-spacer having different heights can be formed together through, for example, a photolithography process in which after applying a positive transparent resin material, which is a kind of a photosensitive resin material, the resin material is exposed through a halftone mask of which transmissivity varies locally and developed.

When the spacer SP which is located at the intersection of the scanning line G2 and the signal line S2 is noted, the spacer SP is positioned between a contact hole CH1 for electrically connecting the switching element SW1 and the pixel electrode PE1 and a contact hole CH2 for electrically connecting the switching element SW2 and the pixel electrode PE2. The contact hole CH1 is disposed on one side with respect to the scanning line G2, in other words, disposed between the scanning line G2 and the scanning line G3. The contact hole CH2 is disposed on the other side with respect to the scanning line G2, in other words, disposed between the scanning line G1 and the scanning line G2. The positional relationship between the spacer SP and the contact holes CH1 and CH2 will be described in detail later.

Figure 3:
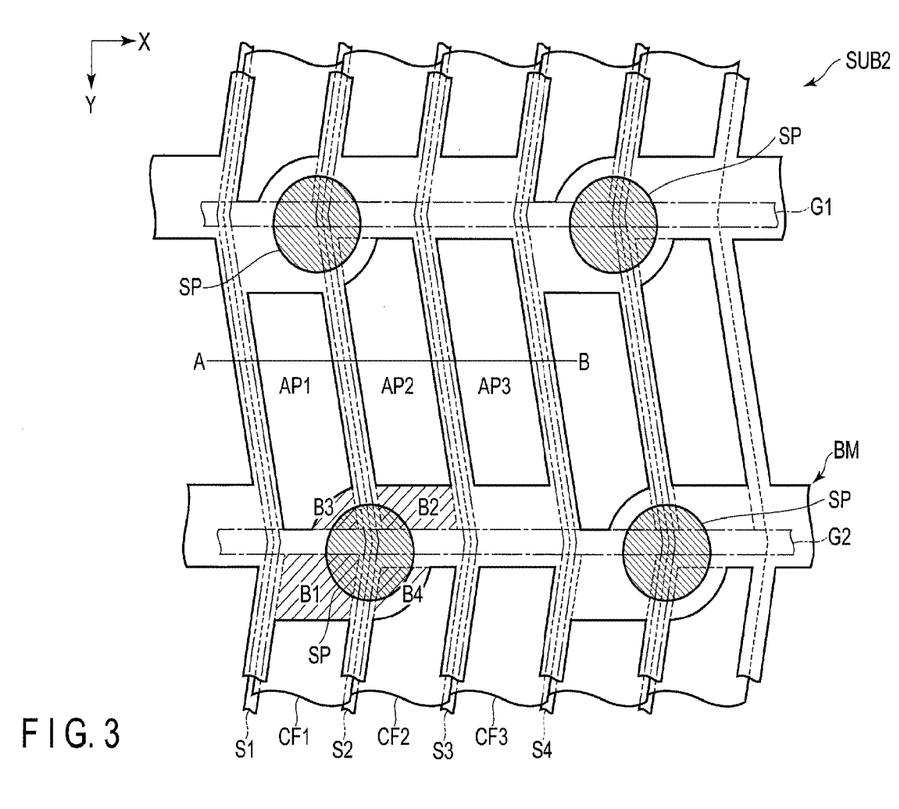
FIG. 3 is a plan view showing an example of the structure of a second substrate SUB2 which is opposed to the first substrate SUB1 shown in FIG. 2.

FIG. 3 is a plan view showing an example of the structure of the second substrate SUB2 which is opposed to the first substrate SUB1 shown in FIG. 2.

The second substrate SUB2 includes a light-shielding layer BM, color filters CF1 to CF3, and the like.

The light-shielding layer BM is arranged in an area opposed to interconnecting portions such as the scanning lines G1 and G2, the signal lines S1 to S4, the contact portions PA1 to PA3, and the switching elements SW1 to SW3, as shown in FIG. 2. Note that the scanning lines G1 and G2 are depicted by a one-dot chain line in the figure, and the signal lines S1 to S4 are depicted by a two-dot chain line in the figure. The light-shielding layer BM defines apertures AP1 to AP3. The apertures AP1 to AP3 correspond to regions opposed to the electrode portions PB1 to PB3 shown in FIG. 2, respectively.

Here, a region near the intersection of the scanning line G2 and the signal line S2 in the figure is noted. The light-shielding layer BM includes extension portions B1 to B4. The extension portions B1 to B4 are arranged in the first direction X with a region opposed to the signal line S2 interposed between these extension portions. The extension portions B2 and B3 are arranged side by side in the first direction X with the region opposed to the signal line S2 interposed between these extension portions. Further, the extension portions B2 and B3 are arranged on the opposite side of the extension portions B1 and B4 with a region opposed to the scanning line G2 interposed between these extension portions. The extension portions B1 and B2 correspond to regions opposed to the contact portions PA1 and PA2 shown in FIG. 2, respectively. These extension portions B1 to B4 correspond to a region opposed to the spacer SP.

The color filters CF1 to CF3 are arranged in the apertures AP1 to AP3, respectively. Also, the color filters CF1 to CF3 are each formed in a strip shape extending in the second direction Y, and are alternately disposed along the first direction. In one example, the color filter (first color filter) CF1 is a blue (B) color filter, the color filter (second color filter) CF2 is a red (R) color filter, and the color filter (third color filter) CF3 is a green (G) color filter. The color filters CF1 to CF3 have mutually adjacent end portions overlapping the light-shielding layer BM.

Note that in the example illustrated, although the second substrate SUB2 includes the color filters CF1 to CF3 of three colors, the second substrate SUB2 may include color filters of four colors or more including a color filter of a color other than blue, red, and green, such as white or transparent. Also, the color filters CF1 to CF3 may be provided in the first substrate SUB1.

Figure 4:
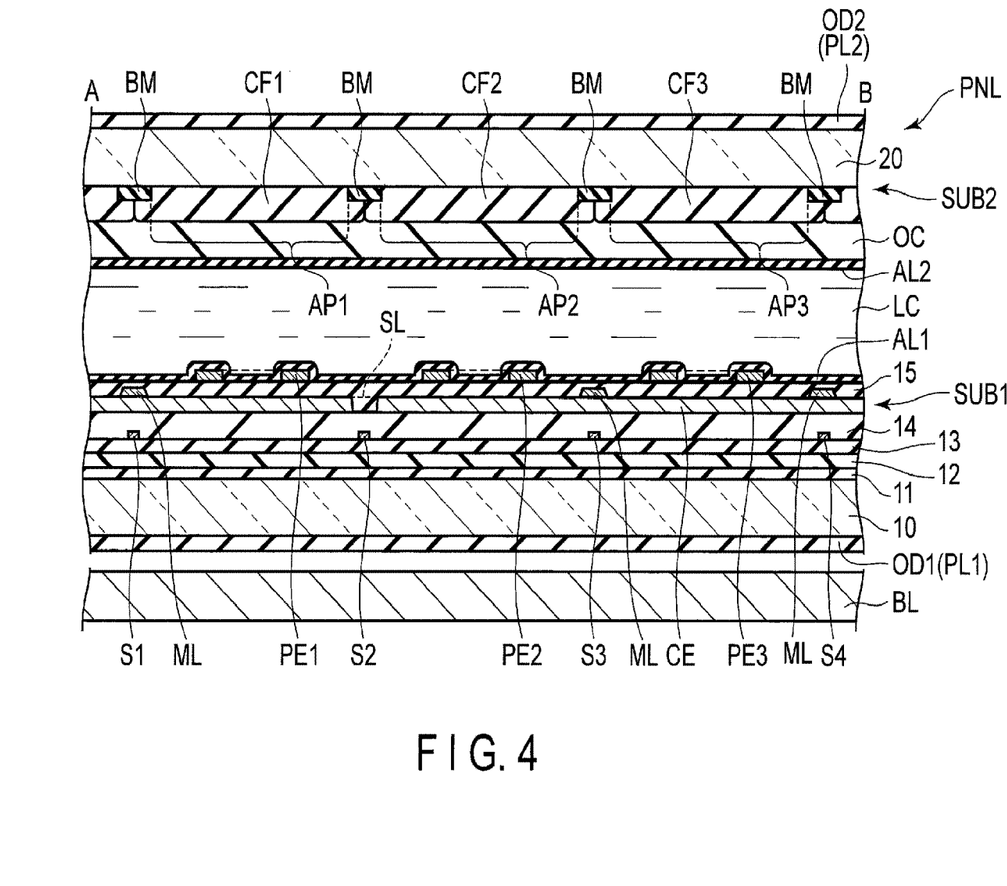
FIG. 4 is a cross-sectional view showing an example of the structure of a display panel PNL taken along line A-B of FIG. 3.

FIG. 4 is a cross-sectional view showing an example of the structure of the display panel PNL taken along line A-B of FIG. 3. Here, only the main portions necessary for explanation are shown. In the following descriptions, a direction from the first substrate SUB1 to the second substrate SUB2 is referred to as upward, or more simply, above.

The first substrate SUB1 is structured by using a first insulating substrate 10 that is transparent such as a glass substrate or a resin substrate. The first substrate SUB1 includes, on the first insulating substrate 10 at the side opposed to the second substrate SUB2, a first insulating film 11, a second insulating film 12, a third insulating film 13, a fourth insulating film 14, a fifth insulating film 15, the signal lines S1 to S4, the pixel electrodes PE1 to PE3, the common electrode CE, a first alignment film AL1, and the like.

The first insulating film 11 is disposed on the first insulating substrate 10. The second insulating film 12 is disposed on the first insulating film 11. The third insulating film 13 is disposed on the second insulating film 12. The signal lines S1 to S4 are disposed on the third insulating film 13. The fourth insulating film 14 is disposed on the third insulating film 13, and covers the signal lines S1 to S4.

The common electrode CE is disposed on the fourth insulating film 14. Further, the common electrode CE is opposed to the signal lines S1, S3, and S4 via the fourth insulating film 14. The slit SL of the common electrode CE is located directly above the signal line S2. The metal layers ML overlap the common electrode CE directly above the signal lines S1, S3, and S4. The common electrode CE and the metal layers ML are covered by the fifth insulating film 15. The first insulating film 11, the second insulating film 12, the third insulating film 13, and the fifth insulating film 15 are each formed of a transparent inorganic material such as a silicon oxide or a silicon nitride. The fourth insulating film 14 is formed of a transparent resin material, and has a greater film thickness as compared to the other insulating films formed of the inorganic material.

The pixel electrodes PE1 to PE3 are located on the fifth insulating film 15, and are opposed to the common electrode CE via the fifth insulating film 15. The pixel electrodes PE1 to PE3 and the common electrode CE are formed of, for example, a transparent conductive material such as indium tin oxide or indium zinc oxide. The pixel electrodes PE1 to PE3 are covered with the first alignment film AL1. The first alignment film AL1 also covers the fifth insulating film 15.

The second substrate SUB2 is structured by using a second insulating substrate 20 that is transparent such as a glass substrate or a resin substrate. The second substrate SUB2 includes, on the second insulating substrate 20 at the side opposed to the first substrate SUB1, the light-shielding member BM, the color filters CF1 to CF3, an overcoat layer OC, a second alignment film AL2, and the like.

The light-shielding member BM is located on the second insulating substrate 20 at the side opposed to the first substrate SUB1. The light-shielding layer BM defines the apertures AP1 to AP3 which are opposed to the pixel electrodes PE1 to PE3, respectively. The light-shielding layer BM is formed of a black resin material or a light-shielding metal material.

Each of the color filters CF1 to CF3 is provided on the second insulating substrate 20 at the side opposed to the first substrate SUB1, and end portions of each of these color filters overlap the light-shielding layer BM. The color filter CF1 is located in the aperture AP1, and is opposed to the pixel electrode PE1. The color filter CF2 is located in the aperture AP2, and is opposed to the pixel electrode PE2. The color filter CF3 is located in the aperture AP3, and is opposed to the pixel electrode PE3. In one example, the color filters CF1 to CF3 are formed of resin materials colored blue, red, and green, respectively.

The overcoat layer OC covers the color filters CF1 to CF3. The overcoat layer OC is formed of a transparent resin material. The second alignment film AL2 covers the overcoat layer OC. The first alignment film AL1 and the second alignment film AL2 are formed of, for example, a material which exhibits horizontal alignment properties.

The first substrate SUB1 and the second substrate SUB2 as described above are disposed such that the first alignment film AL1 and the second alignment film AL2 face each other. The liquid crystal layer LC is sealed between the first alignment film AL1 and the second alignment film AL2. The liquid crystal layer LC is composed of a negative liquid crystal material having a negative dielectric anisotropy or a positive liquid crystal material having a positive dielectric anisotropy.

In the display panel PNL having such a structure, the first substrate SUB1 is opposed to the backlight unit BL, and the second substrate SUB2 is located on the display surface side. Various types of units are applicable as the backlight unit BL, but explanation of details of the structure is omitted.

A first optical element OD1 including a first polarizer PL1 is disposed on the outer surface of the first insulating substrate 10, or more specifically, the surface which is opposed to the backlight unit BL. A second optical element OD2 including a second polarizer PL2 is disposed on the outer surface of the second insulating substrate 20, or more specifically, the surface on the observation position side. A first polarization axis of the first polarizer PL1 and a second polarization axis of the second polarizer PL2 are in a crossed-Nicol relationship in the X-Y plane, for example. It should be noted that each of the first optical element OD1 and the second optical element OD2 may include other optical function elements such as a retardation film.

Next, an example of the operation of the liquid crystal display device having the above structure will be described. A case where the liquid crystal layer LC is composed of a negative liquid crystal material will be described referring to FIGS. 2 and 4.

In a state in which no voltage is applied to the liquid crystal layer LC, that is, at an off-time when no electric field is produced between the pixel electrodes PE1 to PE3 and the common electrode CE, a liquid crystal molecule LM is initially aligned, as indicated by a broken line in the drawing in an enlarged scale, in a direction in which its major axis is oriented parallel to the first direction X in the X-Y plane. Such an off-time corresponds to the initial alignment state, and the alignment direction of the liquid crystal molecules LM at the off-time corresponds to the initial alignment direction. The initial alignment state is realized by subjecting both of the first alignment film AL1 and the second alignment film AL2 to alignment treatment in the first direction X. A method of the alignment treatment may be a rubbing treatment or the other methods such as an optical alignment treatment.

At the off-time, part of light from the backlight unit BL is transmitted through the first polarizer PL1 and enters the display panel PNL. The light which enters the display panel PNL is linearly polarized light orthogonal to the first polarization axis or absorption axis of the first polarizer PL1. The polarized state of the linearly polarized light hardly varies when the light passes through the liquid crystal layer LC at the off-time. Therefore, the linearly polarized light which passes through the display panel PNL is absorbed by the second polarizer PL2 which is in the crossed-Nicol relationship with the first polarizer PL1. Thereby, a dark state or a black display state can be obtained.

Meanwhile, in a state in which a voltage is applied to the liquid crystal layer LC, that is, at an on-time when an electric field is produced between the pixel electrodes PE1 to PE3 and the common electrode CE, the alignment state of the liquid crystal molecule LM is changed by the electric field, and the liquid crystal molecule LM is aligned, as indicated by a solid line in the drawing in an enlarged scale, in a direction different from the initial alignment direction. The electric field is produced mainly in a direction which is orthogonal to the edges of the electrode portion PB in the X-Y plane. In the drawing, an arrow indicates the direction of rotation of the liquid crystal molecule LM with respect to the initial alignment direction. In the case of a negative liquid crystal material, the liquid crystal molecules LM are aligned in such a direction that their major axes are oriented in a direction substantially perpendicular to the electric field.

At the on-time, the polarized state of the linearly polarized light made incident on the display panel PNL is varied in accordance with the alignment state of the liquid crystal molecules LM when the linearly polarized light passes through the liquid crystal layer LC. Therefore, in the on-state, at least part of the light which has passed through the liquid crystal layer LC is transmitted through the second polarizer PL2. Thereby, a light state or a white display state can be obtained.

Although a detailed explanation of a case where the liquid crystal layer LC is composed of a positive liquid crystal material will not be given, in the off-time, the liquid crystal molecules LM are initially aligned in a direction parallel to the second direction Y, for example. At the on-time, the liquid crystal molecules LM are aligned in such a direction that their major axes are oriented in a direction substantially parallel to the electric field. Therefore, the polarized state of the linearly polarized light made incident on the display panel PNL is varied in accordance with the alignment state of the liquid crystal molecules LM when the linearly polarized light passes through the liquid crystal layer LC, and at least part of the light passes through the second polarizer PL2.

Next, the structure of the switching elements SW1 to SW3 shown in FIG. 2 will be described in more detail.

Figure 5:
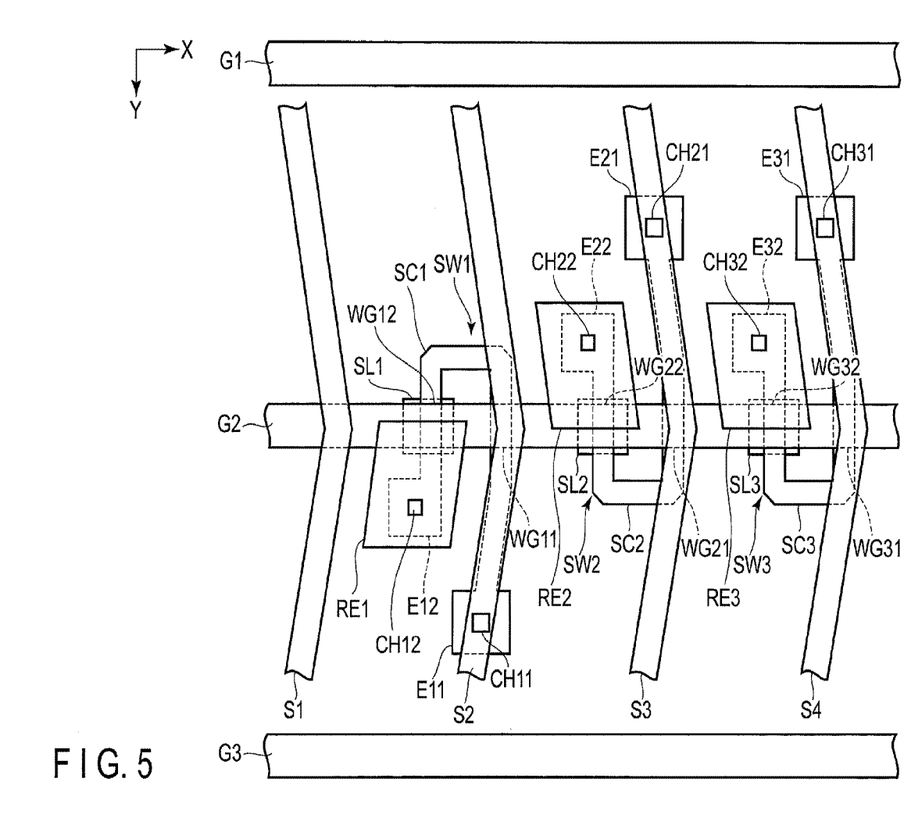
FIG. 5 is a plan view showing an example of the structure of switching elements SW1 to SW3.

FIG. 5 is a plan view showing an example of the structure of the switching elements SW1 to SW3. Here, only the main portions necessary for explanation of the first substrate SUB1 are shown in the figure, and the illustration of elements such as the common electrode CE, the pixel electrodes PE1 to PE3, and the metal layers ML is omitted.

The switching elements SW1 to SW3 are arranged in the first direction X. The switching element SW1 includes a light-shielding body SL1, a semiconductor layer SC1, and a relay electrode RE1. The switching element SW2 includes a light-shielding body SL2, a semiconductor layer SC2, and a relay electrode RE2. The switching element SW3 includes a light-shielding body SL3, a semiconductor layer SC3, and a relay electrode RE3. Each of the semiconductor layers SC1 to SC3 is formed to be substantially U-shaped, and intersects the scanning line G2 at two points. However, while the semiconductor layer SC1 includes a turnaround portion on the scanning line G1 side with respect to the scanning line G2, the semiconductor layers SC2 and SC3 include turnaround portions on the scanning line G3 side with respect to the scanning line G2. Each of the structures of the switching elements SW1 to SW3 will be hereinafter described.

In the switching element (first switching element) SW1, the semiconductor layer (first semiconductor layer) SC1 includes an end portion (first end portion) E11 and an end portion (second end portion) E12. The end portion E11 is electrically connected to the signal line (first signal line) S2 through a contact hole CH11. The end portion E12 is electrically connected to the relay electrode (first relay electrode) RE1 through a contact hole CH12. The relay electrode RE1 is located between the signal lines S1 and S2. Also, the relay electrode RE1 and the end portions E11 and E12 are all located on the scanning line G3 side with respect to the scanning line G2.

In the scanning line G2, two portions which intersect the semiconductor layer SC1 serve as gate electrodes WG11 and WG12, respectively. The light-shielding body SL1 is located immediately below a portion which intersects the gate electrode WG12 in the semiconductor layer SC1.

In the switching element (second switching element) SW2, the semiconductor layer (second semiconductor layer) SC2 includes an end portion (third end portion) E21 and an end portion (fourth end portion) E22. The end portion E21 is electrically connected to the signal line (second signal line) S3 through a contact hole CH21. The end portion E22 is electrically connected to the relay electrode (second relay electrode) RE2 through a contact hole CH22. The relay electrode RE2 is located between the signal lines S2 and S3. Also, the relay electrode RE2 and the end portions E21 and E22 are all located on the scanning line G1 side with respect to the scanning line G2.

In the scanning line G2, two portions which intersect the semiconductor layer SC2 serve as gate electrodes WG21 and WG22, respectively. The light-shielding body SL2 is located immediately below a portion which intersects the gate electrode WG22 in the semiconductor layer SC2.

The switching element SW3 has the same structure as the switching element SW2, and so a detailed description of the switching element SW3 will be omitted. The relay electrode RE3 and end portions E31 and E32 of the semiconductor layer SC3 are all located on the scanning line G1 side with respect to the scanning line G2.

When the positions of the relay electrodes RE1 to RE3 are noted, the relay electrodes RE2 and RE3 are disposed on the same straight line along the first direction X. The relay electrode RE1 is displaced from the location of the relay electrodes RE2 and RE3 to the opposite side with respect to the scanning line G2. Note that while each of the relay electrodes RE1 to RE3 partially overlaps the scanning line G2, the entirety of the relay electrodes RE1 to RE3 may be separated from the scanning line G2.

Figure 6:
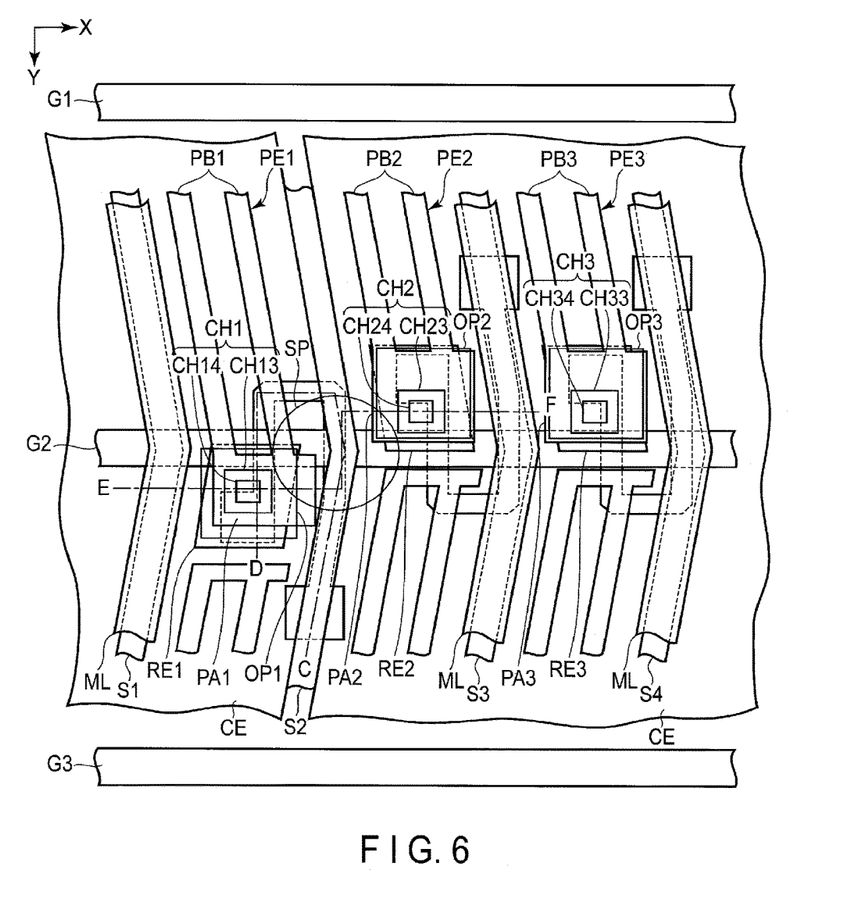
FIG. 6 is a plan view showing an example of structure of connections between the switching elements SW1 to SW3 and pixel electrodes PE1 to PE3.

FIG. 6 is a plan view showing an example of structure of connections between the switching elements SW1 to SW3 and the pixel electrodes PE1 to PE3.

The contact portion (first contact portion) PA1 of the pixel electrode (first pixel electrode) PE1 is opposed to the relay electrode (first relay electrode) RE1, and is electrically connected to the relay electrode RE1 through the contact hole (first contact hole) CH1 positioned at an opening OP1 of the common electrode CE. The contact hole CH1 includes a contact hole CH13 formed in the fourth insulating film 14, and a contact hole CH14 formed in the fifth insulating film 15, as will be described later. The opening OP1 and the contact hole CH1 are both located on the scanning line G3 side with respect to the scanning line G2. The electrode portion (first electrode portion) PB1 extends from the contact portion PA1 toward the scanning line G1 beyond the scanning line G2.

The contact portion (second contact portion) PA2 of the pixel electrode (second pixel electrode) PE2 is opposed to the relay electrode (second relay electrode) RE2, and is electrically connected to the relay electrode RE2 through the contact hole (second contact hole) CH2 positioned at an opening OP2 of the common electrode CE. The contact hole CH2 includes a contact hole CH23 formed in the fourth insulating film 14, and a contact hole CH24 formed in the fifth insulating film 15. The opening OP2 and the contact hole CH2 are both located on the scanning line G1 side with respect to the scanning line G2. The electrode portion (second electrode portion) PB2 extends from the contact portion PA2 toward the scanning line G1.

The pixel electrode (third pixel electrode) PE3 has the same structure as the pixel electrode PE2, and so a detailed description of the pixel electrode PE3 will be omitted. An opening OP3 for connecting the contact portion (third contact portion) PA3 and the relay electrode (third relay electrode) RE3, and the contact hole (third contact hole) CH3 are both located on the scanning line G1 side with respect to the scanning line G2. That is, the contact holes CH2 and CH3 are aligned on the same straight line along the first direction X. In contrast, the contact holes CH1 and CH2 are arranged in an oblique direction which intersects the first direction X. That is, the contact hole CH1 is provided at a position displaced from the same straight light on which the contact holes CH2 and CH3 are aligned.

The spacer SP is positioned between the contact hole CH1 and the contact hole CH2. In the example illustrated, in the X-Y plane, a cross-sectional shape of the spacer SP is substantially circular, and the center is located at the intersection of the scanning line G2 and the signal line S2.

Meanwhile, no spacer is arranged between the contact hole CH2 and the contact hole CH3.

Figure 7:
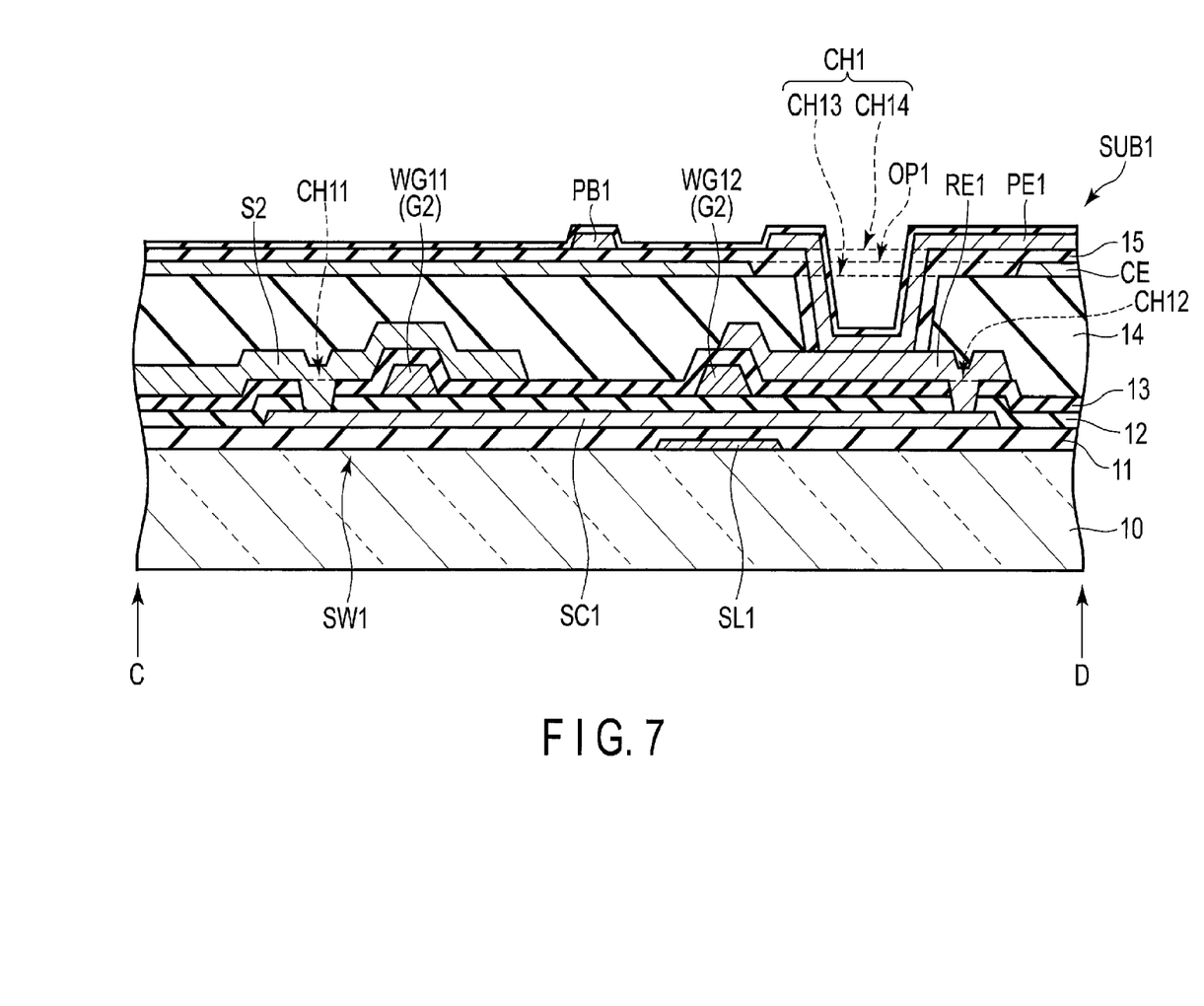
FIG. 7 is a cross-sectional view showing an example of the structure of the first substrate SUB1 including the switching element SW1 shown in FIG. 6 taken along line C-D.

FIG. 7 is a cross-sectional view showing an example of the structure of the first substrate SUB1 including the switching element SW1 shown in FIG. 6 taken along line C-D. Note that in the example illustrated, the switching element SW1 is of a top-gate type, but it may be of a bottom-gate type.

The light-shielding body SL1 is disposed between the first insulating substrate 10 and the first insulating film 11. The semiconductor layer SC1 is located between the first insulating film 11 and the second insulating film 12. The semiconductor layer SC1 is formed of, for example, polycrystalline silicon, but may be formed of amorphous silicon, an oxide semiconductor, or the like.

The gate electrodes WG11 and WG12 are part of the scanning line G2, are disposed between the second insulating film 12 and the third insulating film 13, and are opposed to the semiconductor layer SC1 via the second insulating film 12. The gate electrode WG12 is located directly above the light-shielding body SL1. The signal line S2 and the relay electrode RE1 are located between the third insulating film 13 and the fourth insulating film 14. The signal line S2 is in contact with the semiconductor layer SC1 through the contact hole CH11 which penetrates the second insulating film 12 and the third insulating film 13. The relay electrode RE1 is in contact with the semiconductor layer SC1 through the contact hole CH12 which penetrates the second insulating film 12 and the third insulating film 13.

The common electrode CE is disposed between the fourth insulating film 14 and the fifth insulating film 15. The pixel electrode PE1 is disposed between the fifth insulating film 15 and the first alignment film AL1. The pixel electrode PE1 is in contact with the relay electrode RE1 through the contact hole CH13 which penetrates the fourth insulating film 14, the opening OP1 formed in the common electrode CE, and the contact hole CH14 which penetrates the fifth insulating film 15. The contact holes CH13 and CH14 are included in the contact hole CH1, as described above. Note that the contact hole CH12 may be located immediately below the contact holes CH13 and 14, and in this case, the contact hole CH12 is included in the contact hole CH1.

Figure 8:
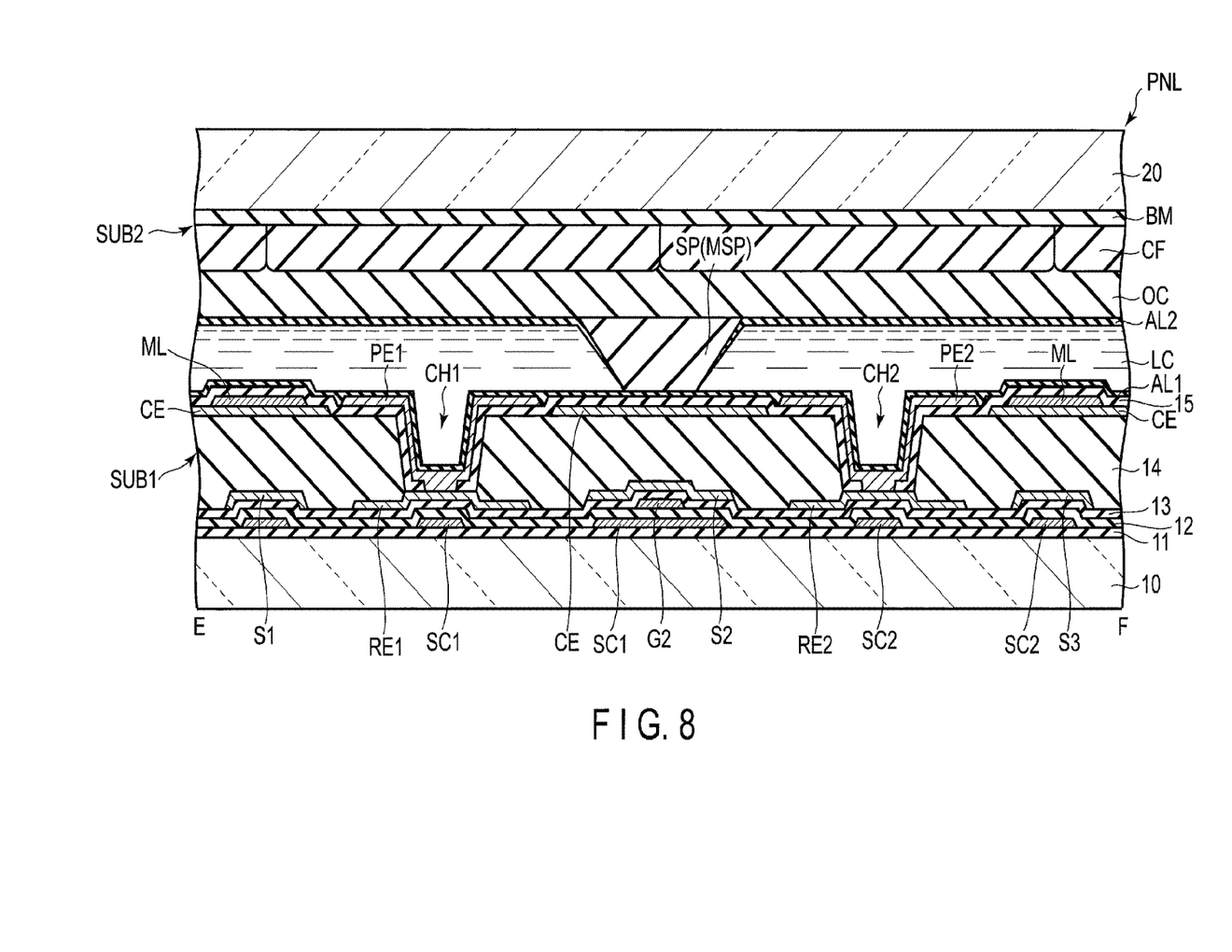
FIG. 8 is a cross-sectional view showing an example of the structure of the display panel PNL including a spacer SP shown in FIG. 6 taken along line E-F.

FIG. 8 is a cross-sectional view showing an example of the structure of the display panel PNL including the spacer SP shown in FIG. 6 taken along line E-F.

The spacer SP is located between the first substrate SUB1 and the second substrate SUB2. The spacer SP of the example illustrated is provided on the second substrate SUB2, corresponds to a main spacer MSP which is in contact with the first substrate SUB1, and forms a predetermined cell gap between the first substrate SUB1 and the second substrate SUB2. More specifically, the spacer SP is located on the overcoat layer OC at the side opposed to the first substrate SUB1, and is in contact with the first alignment film AL1. Note that the spacer SP can be formed by using the same resin material as the overcoat layer OC, and can be formed together with the overcoat layer OC.

A region that the spacer SP contacts is located between the contact holes CH1 and CH2, a surface of the region is substantially flattened by the fourth insulating film 14, and the common electrode CE, the fifth insulating film 15, and the first alignment film AL1 each having a substantially constant film thickness are interposed between the fourth insulating film 14 and the spacer SP. Moreover, no metal layer ML is interposed between the common electrode CE and the spacer SP.

As described above, according to the present embodiment, the spacer SP is located between the contact hole CH1, which is positioned on one side of the scanning line G2 extending in the first direction (that is, on the side closer to the scanning line G3), and the contact hole CH2, which is positioned on the other side of the scanning line G2 (that is, the side closer to the scanning line G1), with the intersection of the scanning line G2 and the signal line S2 being the center.

A region in which the spacer SP is to be arranged is provided near the intersection of the scanning line and the signal line so as to avoid reduction of an area of an aperture which contributes to display of each pixel PX. Meanwhile, the contact hole for establishing electrical connection of the switching element and the pixel electrode is also provided near the intersection of the scanning line and the signal line. Recently, since a pitch along the first direction X of the pixel PX tends to be reduced in accordance with achieving higher definition, the respective contact holes of the pixels PX adjacent in the first direction X are close to one another. In the present embodiment, the region in which the spacer SP is to be arranged is provided between the contact holes CH1 and CH2 which are arranged in a direction intersecting the first direction X. In other words, since the contact hole CH1 and the contact hole CH2 are arranged in the oblique direction intersecting the first direction X, a flat region for arranging the spacer SP can be sufficiently and widely secured between these contact holes. Meanwhile, in the present embodiment, a region for arranging the spacer SP is not provided between the contact holes CH2 and CH3 aligned in the first direction X. That is, in the above example, although the contact hole CH2 and the contact hole CH3 are aligned in the first direction X, since they are close to each other, it is difficult to secure a flat region between these contact holes, and thus, a region for arranging the spacer SP is not provided.

Accordingly, even if misalignment between the first substrate SUB1 and the second substrate SUB2 occurs in the first direction X and the second direction Y, it is possible to prevent the spacer SP from falling into the contact hole. Therefore, a desired cell gap can be obtained, and deterioration in display quality can be suppressed.

Further, as shown in FIG. 5, the semiconductor layer SC of each of the switching elements SW is formed to be substantially U-shaped, both ends of the semiconductor layer SC are positioned on one side with respect to the scanning line, and a turnaround portion is positioned on the other side with respect to the scanning line. Consequently, extension of the switching element SW in the first direction X can be suppressed, and an increase of the ratio of the installation area of the switching element SW to the area of the pixel PX can be suppressed. Therefore, even if the pixel size is reduced in accordance with achieving higher definition, a reduction of an area of the aperture can be suppressed.

Also, as shown in FIG. 8, etc., in the first substrate SUB1, the region that the spacer SP contacts does not include the metal layer ML. For this reason, as compared to a region in which the metal layer ML is arranged such as the region directly above the signal line S1 or the signal line S3, the region immediately above the signal line S2 is more flattened. Therefore, when the spacer SP contacts the first substrate SUB1, occurrence of unevenness in the cell gap caused by a step produced by the metal layer ML can be suppressed.

In addition, in the first substrate SUB1, since the common electrode CE is opposed to the scanning line G and the signal line S, occurrence of an undesired electric field from the scanning line G and the signal line S toward the liquid crystal layer LC can be suppressed. Thereby, occurrence of an alignment error of the liquid crystal molecules LM near the scanning line G and the signal line S can be suppressed, and the deterioration in display quality such as leakage of light can be suppressed. Note that while the common electrode CE includes the slit SL opposed to the signal line S2, the signal line S2 is located between a red pixel and a blue pixel. The red pixel and the blue pixel are pixels of low luminous efficacy colors as compared to a green pixel. Accordingly, even if an undesired electric field from the signal line S2 toward the liquid crystal layer LC is produced, leakage of light is hardly recognized in the red pixel and the blue pixel, and the deterioration in display quality can be suppressed.

Next, another structure example will be described. Note that the same reference numbers will be added to the same structures as those of the structure example described above, and detailed descriptions of them will be omitted.

Figure 9:
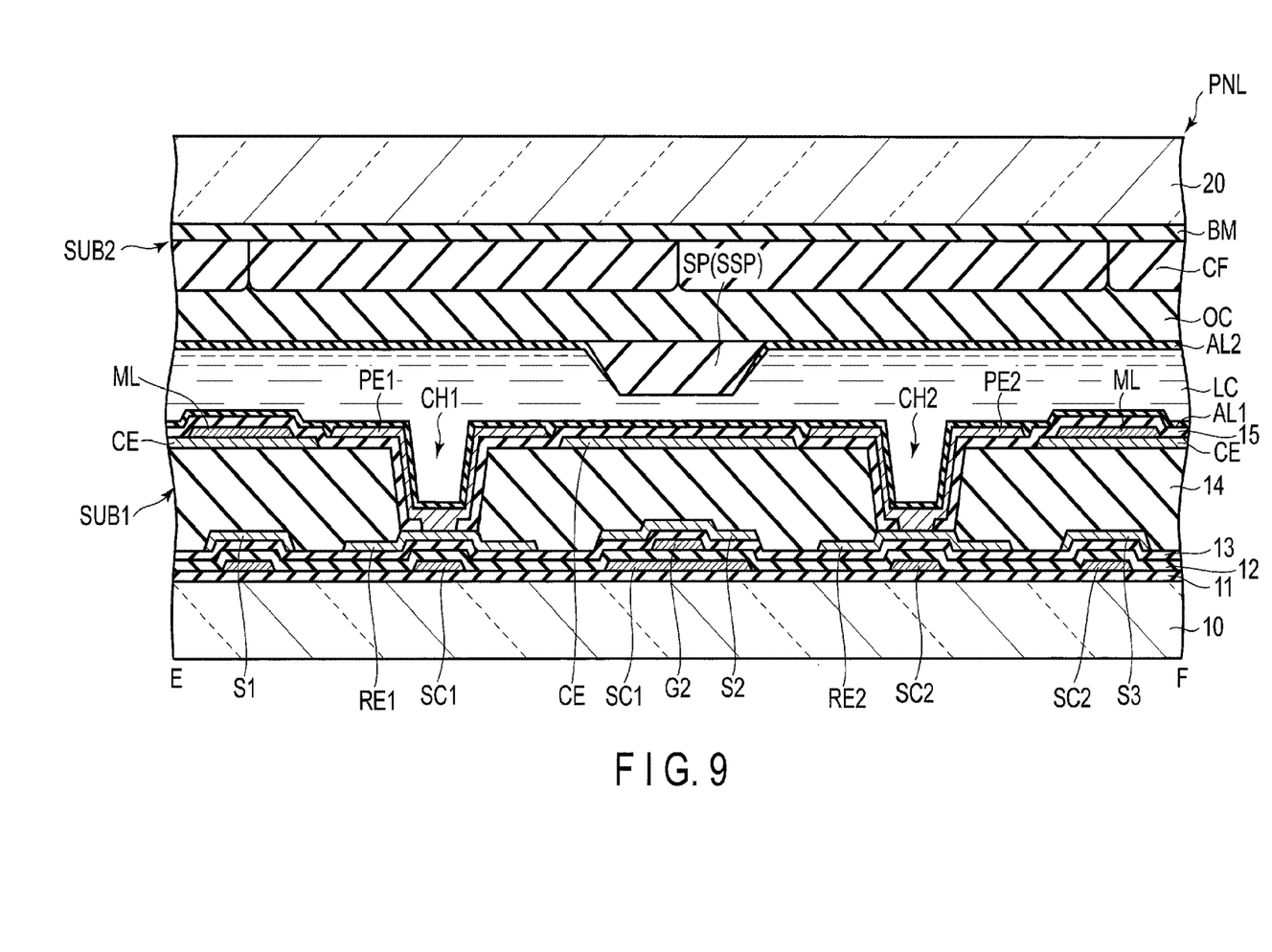
FIG. 9 is a cross-sectional view showing another example of the structure of the display panel PNL including the spacer SP shown in FIG. 6 taken along line E-F.

FIG. 9 is a cross-sectional view showing another example of the structure of the display panel PNL including the spacer SP shown in FIG. 6 taken along line E-F.

As compared to the structure example shown in FIG. 8, the illustrated structure example is different in that the spacer SP is a sub-spacer SSP which is separated from the first substrate SUB1. That is, the liquid crystal layer LC is interposed between the sub-spacer SSP and the first alignment film AL1. The sub-spacer SSP as described above is separated from the first substrate SUB1 in the steady state, as shown in the drawing. However, when impact on a local point is applied to the display panel PNL externally, the sub-spacer SSP is brought into contact with the first substrate SUB1 and absorbs the impact. In this way, resistance to compressive deformation when the external impact is applied can be improved.

Also in this structure example, the same advantages as those of the above-described structure example can be obtained.

Figure 10:
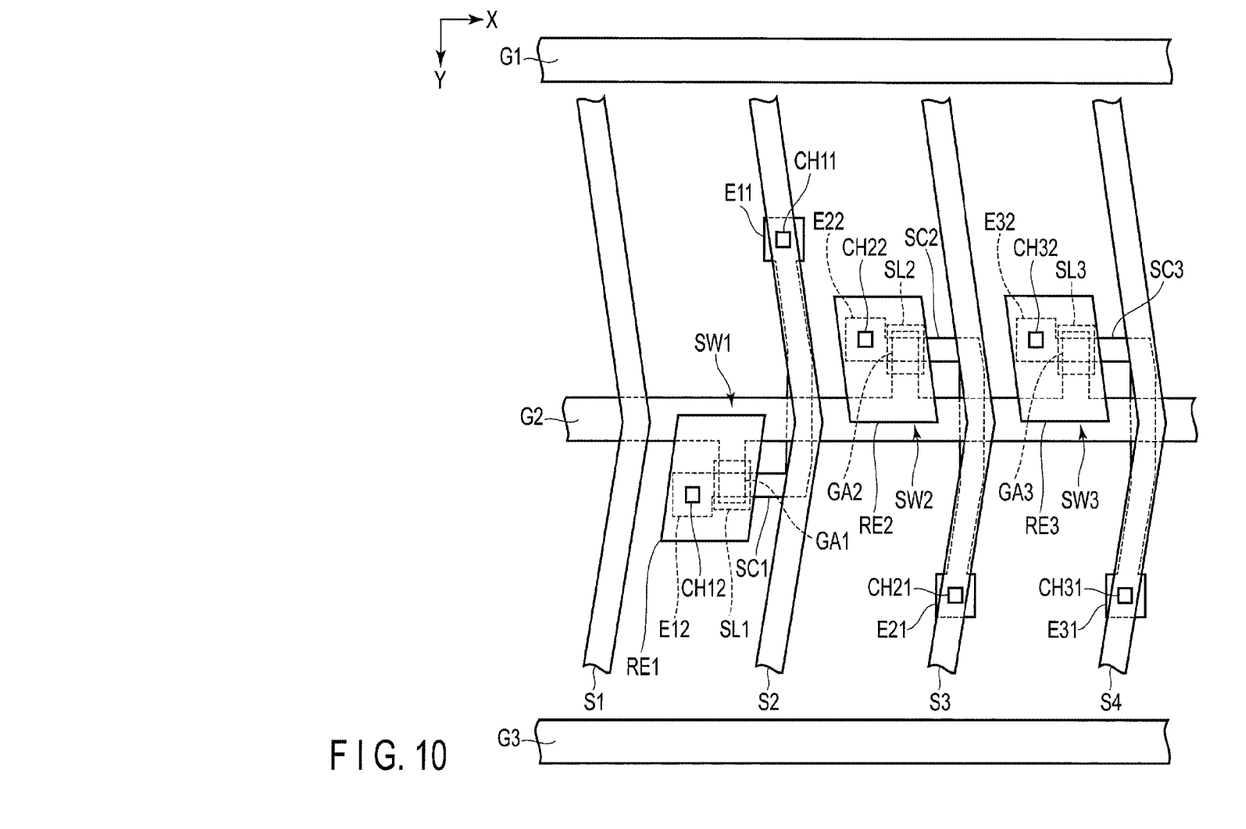
FIG. 10 is a plan view showing another example of the structure of the switching elements SW1 to SW3.

FIG. 10 is a plan view showing another example of the structure of the switching elements SW1 to SW3.

The illustrated structure example is different from the structure example shown in FIG. 5 in that all of the semiconductor layers SC1 to SC3 are formed to be substantially L-shaped, and that the scanning line G2 includes branch portions GA1 to GA3. The branch portion GA1 extends toward the scanning line G3 between the signal lines S1 and S2. The branch portion GA2 extends toward the scanning line G1 between the signal lines S2 and S3. The branch portion GA3 extends toward the scanning line G1 between the signal lines S3 and S4. Each of the semiconductor layers SC1 to SC3 intersects the scanning line G2 including the branch portions GA1 to GA3 at two places. Each of the structures of the switching elements SW1 to SW3 will be hereinafter described.

In the switching element (first switching element) SW1, the end portion (first end portion) E11 of the semiconductor layer (first semiconductor layer) SC1 is located on the scanning line G1 side with respect to the scanning line G2, and is electrically connected to the signal line (first signal line) S2 through the contact hole CH11. The end portion (second end portion) E12 of the semiconductor layer SC1, and the relay electrode (first relay electrode) RE1 are both located on the scanning line G3 side with respect to the scanning line G2, and are electrically connected to each other through the contact hole CH12.

In the switching element (second switching element) SW2, the end portion (third end portion) E21 of the semiconductor layer (second semiconductor layer) SC2 is located on the scanning line G3 side with respect to the scanning line G2, and is electrically connected to the signal line (second signal line) S3 through the contact hole CH21. The end portion (fourth end portion) E22 of the semiconductor layer SC2, and the relay electrode (second relay electrode) RE2 are both located on the scanning line G1 side with respect to the scanning line G2, and are electrically connected to each other through the contact hole CH22.

The switching element SW3 has the same structure as the switching element SW2, and so a detailed description of the switching element SW3 will be omitted. The end portion E31 of the semiconductor layer SC3 is located on the scanning line G3 side with respect to the scanning line G2, and the relay electrode RE3 and the end portion E32 of the semiconductor layer SC3 are both located on the scanning line G1 side with respect to the scanning line G2.

The example of structure of connection as shown in FIG. 6 can also be applied to such a structure example, and the spacer SP is disposed between the contact holes CH1 and CH2 which are arranged in the direction intersecting the first direction X. Accordingly, an advantage similar to that of the above structure example can be obtained.

In each of the structure examples described above, the first substrate SUB1 comprising the common electrode CE between the first insulating substrate 10 and the pixel electrodes PE1 to PE3 has been applied. However, the structure to be applied is not limited to this. For example, a first substrate SUB1 comprising the pixel electrodes PE1 to PE3 between the first insulating substrate 10 and the common electrode CE may be applied. In this case, a structure in which the pixel electrodes PE1 to PE3 are all formed in a flat plate shape, and the common electrode CE includes slits opposed to the pixel electrodes PE1 to PE3 is applicable.

As described above, a liquid crystal display device capable of suppressing the deterioration in display quality can be provided by the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first substrate including a scanning line, a first signal line and a second signal line intersecting the scanning line, a first switching element comprising a first relay electrode and being electrically connected to the first signal line, a second switching element comprising a second relay electrode and being electrically connected to the second signal line, a third switching element comprising a third relay electrode, a first pixel electrode comprising a first contact portion which is opposed to the first relay electrode, and a second pixel electrode comprising a second contact portion which is opposed to the second relay electrode, and a third pixel electrode comprising a third contact portion which is opposed to the third relay electrode;
a second substrate opposed to the first substrate;
a liquid crystal layer held between the first substrate and the second substrate; and
a spacer located between the first substrate and the second substrate,
a first contact hole for connecting the first relay electrode and the first contact portion being located on one side with respect to the scanning line,
a second contact hole for connecting the second relay electrode and the second contact portion being located on the other side with respect to the scanning line,
a third contact hole for connecting the third relay electrode and the third contact portion, and the second contact hole being aligned on a same straight line,
the first contact hole being provided at a position displaced from the same straight line on which the second contact hole and the third contact hole are aligned,
the spacer being located between the first contact hole and the second contact hole.

2. The liquid crystal display device of claim 1, wherein a spacer is not disposed between the second contact hole and the third contact hole.

3. The liquid crystal display device of claim 1, wherein:
the first switching element comprises a first semiconductor layer including a first end portion connected to the first signal line and a second end portion connected to the first relay electrode;
the second switching element comprises a second semiconductor layer including a third end portion connected to the second signal line and a fourth end portion connected to the second relay electrode;
each of the first semiconductor layer and the second semiconductor layer intersects the scanning line at two points;
the first end portion and the second end portion are located on the one side with respect to the scanning line; and
the third end portion and the fourth end portion are located on the other side with respect to the scanning line.

4. The liquid crystal display device of claim 1, wherein:
the first switching element comprises a first semiconductor layer including a first end portion connected to the first signal line and a second end portion connected to the first relay electrode;
the second switching element comprises a second semiconductor layer including a third end portion connected to the second signal line and a fourth end portion connected to the second relay electrode;
each of the first semiconductor layer and the second semiconductor layer intersects the scanning line at two points;
the second end portion and the third end portion are located on the one side with respect to the scanning line; and
the first end portion and the fourth end portion are located on the other side with respect to the scanning line.

5. The liquid crystal display device of claim 1, wherein:
the first substrate further comprises a common electrode, and a metal layer which overlaps the common electrode directly above the second signal line; and
the metal layer is not interposed between the common electrode and the spacer directly above the first signal line.

6. The liquid crystal display device of claim 1, wherein the spacer is provided on the second substrate, and is a main spacer which is in contact with the first substrate or a sub-spacer which is separated from the first substrate.

7. The liquid crystal display device of claim 1, further comprising a light-shielding layer, a first color filter opposed to the first pixel electrode, and a second color filter opposed to the second pixel electrode, wherein
the light-shielding layer is opposed to the scanning line and the first signal line, and extends to a position opposed to the spacer, the first contact portion, and the second contact portion.

8. The liquid crystal display device of claim 7, wherein the first color filter and the second color filter are a blue color filter and a red color filter, respectively.

9. A liquid crystal display device comprising:
a first substrate including a scanning line, a first signal line and a second signal line intersecting the scanning line, a first switching element comprising a first relay electrode and being electrically connected to the first signal line, a second switching element comprising a second relay electrode and being electrically connected to the second signal line, a first pixel electrode comprising a first contact portion which is opposed to the first relay electrode, and a second pixel electrode comprising a second contact portion which is opposed to the second relay electrode;
a second substrate opposed to the first substrate;
a liquid crystal layer held between the first substrate and the second substrate; and
a spacer located between the first substrate and the second substrate,
a first contact hole for connecting the first relay electrode and the first contact portion being located on one side with respect to the scanning line,
a second contact hole for connecting the second relay electrode and the second contact portion being located on the other side with respect to the scanning line,
the spacer being located between the first contact hole and the second contact hole, wherein:
the first pixel electrode comprises a first electrode portion shaped in a strip extending from the first contact portion;
the second pixel electrode comprises a second electrode portion shaped in a strip extending from the second contact portion; and
the first electrode portion and the second electrode portion extend toward the other side with respect to the scanning line.

10. A liquid crystal display device comprising:
a first substrate including first to third scanning lines arranged in order, a first signal line and a second signal line intersecting the second scanning line, a first switching element electrically connected to the first signal line, a second switching element electrically connected to the second signal line, a first pixel electrode comprising a first contact portion which is connected to the first switching element, and a second pixel electrode comprising a second contact portion which is connected to the second switching element;
a second substrate opposed to the first substrate;
a liquid crystal layer held between the first substrate and the second substrate; and
a spacer located between the first substrate and the second substrate,
a first contact hole for connecting the first switching element and the first contact portion being located between the second scanning line and the third scanning line,
a second contact hole for connecting the second switching element and the second contact portion being located between the first scanning line and the second scanning line,
the spacer being located between the first contact hole and the second contact hole.

11. The liquid crystal display device of claim 10, wherein:
the first pixel electrode is located between the first scanning line and the third scanning line, and intersects the second scanning line;
the first contact portion is located between the second scanning line and the third scanning line; and
the second pixel electrode is located between the first scanning line and the second scanning line, and does not extend between the second scanning line and the third scanning line.

12. The liquid crystal display device of claim 11, wherein:
the first pixel electrode comprises a first electrode portion shaped in a strip extending from the first contact portion toward the first scanning line;
the second pixel electrode comprises a second electrode portion shaped in a strip extending from the second contact portion toward the first scanning line; and
the second electrode portion is closer to the first scanning line than the first electrode portion is.

13. The liquid crystal display device of claim 10, wherein an overlapping area of the second pixel electrode and the second scanning line is smaller than an overlapping area of the first pixel electrode and the second scanning line.

* * * * *